(12) United States Patent
Groholski

(10) Patent No.: US 11,224,974 B2
(45) Date of Patent: Jan. 18, 2022

(54) BOTTLE GRIPPING ASSEMBLY

(71) Applicant: AMTIG ENGINEERING SOLUTIONS, LLC, Coldwater, MI (US)

(72) Inventor: Steven Groholski, Coldwater, MI (US)

(73) Assignee: AMTIG ENGINEERING SOLUTIONS, LLC, Coldwater, MI (US)

( * ) Notice: Subject to any disclaimer, the term of this patent is extended or adjusted under 35 U.S.C. 154(b) by 81 days.

(21) Appl. No.: 16/743,312

(22) Filed: Jan. 15, 2020

(65) Prior Publication Data
US 2021/0213622 A1 Jul. 15, 2021

(51) Int. Cl.
*B25J 15/00* (2006.01)
*B25J 19/00* (2006.01)
*B25J 15/08* (2006.01)

(52) U.S. Cl.
CPC ....... *B25J 15/0061* (2013.01); *B25J 15/0042* (2013.01); *B25J 15/08* (2013.01); *B25J 19/0066* (2013.01)

(58) Field of Classification Search
CPC .... B25J 15/0061; B25J 15/08; B25J 15/0042; B25J 19/0066
See application file for complete search history.

(56) References Cited

U.S. PATENT DOCUMENTS

| | | | | |
|---|---|---|---|---|
| 6,079,541 A * | 6/2000 | Bercelli | ................. | B08B 9/426 198/377.03 |
| 8,191,948 B2 * | 6/2012 | Preti | ....................... | B67C 3/242 294/116 |
| 8,602,471 B2 * | 12/2013 | Bodtlander | .......... | B65G 47/847 294/192 |
| 8,899,646 B2 * | 12/2014 | Wilson | .................. | B25J 9/0015 294/99.1 |
| 9,022,442 B2 * | 5/2015 | Rousseau | ............. | B25J 15/0028 294/90 |
| 2014/0238825 A1 * | 8/2014 | Schulnig | ................ | B65G 47/90 198/570 |

* cited by examiner

*Primary Examiner* — Stephen A Vu
(74) *Attorney, Agent, or Firm* — Flynn Thiel, P.C.

(57) ABSTRACT

A bottle gripping assembly including a pair of bottle gripping arms each having a grip member for gripping a bottle therebetween. The bottle gripping assembly also includes a base supporting the bottle gripping arms, with the base having a top surface and a recess into the top surface, a wear pad located in the recess of the base, with the wear pad and the base under the upper surface of the recess having a pair of aligned fastener holes, a pair of fasteners, with each one of the fasteners extending through one of the bottle gripping arms and into one of the fastener holes to connect the bottle gripping arms to the wear pad and the base, and a pair of wear bushings, with each of the wear bushings having a tubular portion that extends into one of the bottle gripping arms and surrounds a portion of the fasteners.

24 Claims, 5 Drawing Sheets

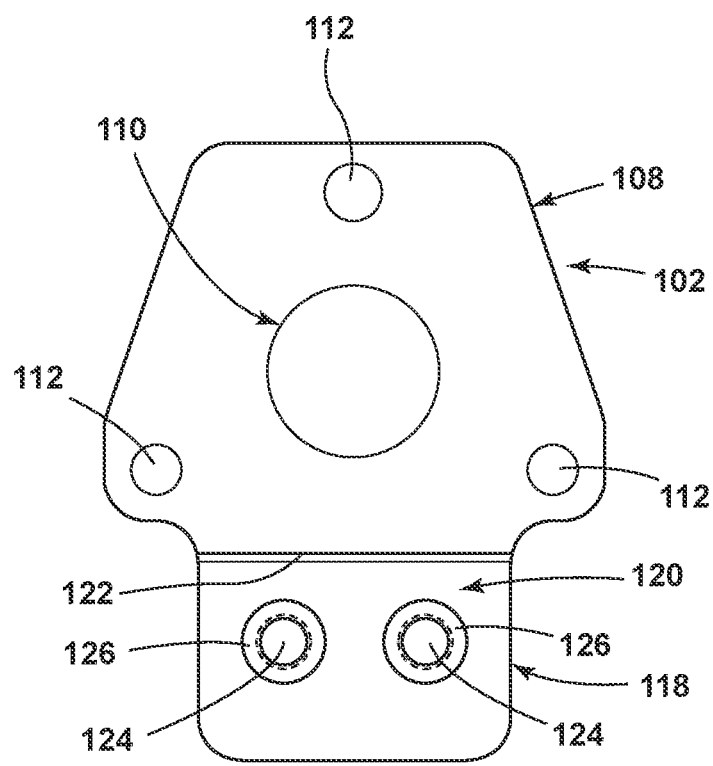
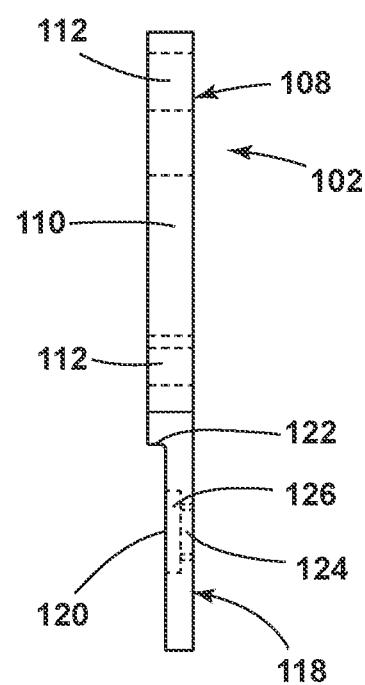
FIG. 6
FIG. 7

BOTTLE GRIPPING ASSEMBLY

FIELD OF THE INVENTION

The present invention relates to bottling, and in particular to an improved bottle gripping assembly.

BACKGROUND OF THE INVENTION

Conveyor systems have been developed for quickly filling and capping a multitude of bottles in a very short period of time. The conveyor systems move empty and uncapped bottles along a line and/or along a periphery of a wheel and fill the bottles (with, for example, water, soda or any other liquid) and cap the bottles while the bottles continuously move.

FIGS. 1A and 1B illustrate a prior art bottle gripping assembly 10. The prior art bottle gripping assembly 10 includes a pair of grip arms 12 that grip the bottle (not shown) as the bottle is moved about the periphery of a wheel. The prior art bottle gripping assembly 10 includes a base plate 14 for holding the grip arms 12. The base plate 14 can be a part of the wheel of the conveyor system or can be connected to the wheel. The base plate 14 includes a rear wide portion 16 having a central actuator opening 18. The rear wide portion 16 of the base plate 14 is also shown as including a plurality of fastener opening 20 for accepting fasteners therethrough for connecting the base plate 14 to the wheel of the conveyor system. The base plate 14 also includes a front narrow support portion 22 with a pair of bolt openings (not shown).

The grip arms 12 of the prior art bottle gripping assembly 10 are actuated to selectively grip and hold the bottles. The grip arms 12 are mirror images of each other such that only one grip arm 12 will be discussed, with the understanding that the other grip arm 12 has the same features in reverse. The grip arm 12 includes a main section 24 that tapers toward the rear of the grip arm 12. The main section 24 includes an inwardly facing C-shaped rear recess 26 having a pair of end fingers 28 that extend toward each other and that each define a spring receiving slot 30. A vertically oriented leaf spring 32 is located within the inwardly facing C-shaped rear recess 26, with ends of the vertically oriented leaf spring 32 being located within the spring receiving slots 30. A middle area of the main section 24 includes a bolt hole (not shown). A front area of the main section 24 includes an inwardly facing spring recess 34. As illustrated in FIG. 1A, a spring 36 extends between the inwardly facing spring recesses 34 of the grip arms 12, with ends of the spring 36 being located within facing spring receiving bores (not shown). The grip arm 12 also includes a front curved grip member 38 having an arcuate inner face 40. A plurality of support lips 42 extending inwardly from the arcuate inner face 40.

A top holder bracket 44 and a pair of bolts 52 connect the grip arms 12 to the base plate 14. The top holder bracket 44 is substantially rectangular and includes a T-shaped opening 46 as viewed from the top (FIG. 1A). A rear portion of the top holder bracket 44 outside of the T-shaped opening 46 defines a support bar 48. Front panels 50 on either side of the base of the T-shaped opening 46 have bolt holes (not shown). The bolts 52 have heads 54 that rest on the top of the front panels 50. Threaded post portions 58 of the bolts 52 extend through the bolt holes in the front panels 50 of the top holder bracket 44, through the bolt holes in the middle area of the main section 24 of the grip, arms 12 and into the bolt openings (which are internally threaded) in the front narrow support portion 22 of the base plate 14.

FIG. 1A illustrates the prior art bottle gripping assembly 10 in a bottle receiving position. As illustrated in FIG. 1A, a flat actuator 56 extends through the actuator opening 18 rear wide portion 16 of the base plate 14 and is located between the leaf springs 32 of the grip arms 12. When the flat actuator 56 does not abut the leaf springs 32 (as shown), the spring 36 forces the front curved grip members 38 of the grip arms 12 away from each other about the threaded post portions 58 of the bolts 52. However, when an upper portion of the bottle is inserted into the area 60 between the front curved grip members 38 of the grip arms 12, the flat actuator 56 is rotated by 90° to press against the leaf springs 32, thereby forcing the rear area of main section 24 of the grip arms 12 away from each other about the threaded post portions 58 of the bolts 52, such that the front curved grip members 38 of the grip arms 12 move toward each other and capture the top portion of the bottle within the area 60 between the front curved grip members 38 of the grip arms 12 and the support lips 42 being located below a ring of the bottle.

In the prior art bottle process, all parts of the prior art bottle gripping assembly 10 were made of metal and needed to be replaced after substantial wear. Replacing the prior art bottle gripping assemblies 10 requires that the bottling process be stopped, which can be quite costly.

SUMMARY OF THE INVENTION

The present invention, according to one aspect, is directed to a bottle gripping assembly comprising a pair of bottle gripping arms, with each of the bottle gripping arms having a grip member such that when the grip members of the bottle gripping arms are moved toward each other, the pair of bottle gripping arms can grip a bottle therebetween. The bottle gripping assembly also includes a base for supporting the pair of bottle gripping arms, with the base having a top surface and a recess into the top surface such that a step is located between the top surface of the base and an upper surface of the recess. The bottle gripping assembly further includes a wear pad located in the recess of the base, with the wear pad having a top face substantially level with the top surface of the base. The wear pad and the base under the upper surface of the recess have a pair of aligned fastener holes. The bottle gripping assembly also includes a pair of fasteners, with each one of the fasteners extending through one of the bottle gripping arms and into one of the fastener holes to connect the bottle gripping arms to the wear pad and the base. The wear pad is sandwiched between a bottom surface of the bottle gripping arms and the upper surface of the recess.

Another aspect of the present invention is to provide a bottle gripping assembly comprising a pair of bottle gripping arms, a base, a pair of fasteners, a pair of wear bushings and a pair of inner bushings. Each of the bottle gripping arms have a grip member such that when the grip members of the gripping arms are moved toward each other, the pair of bottle gripping arms can grip a bottle therebetween. The base is for supporting the pair of bottle gripping arms, with the base having a top surface and a pair of fastener holes extending into the base. Each one of the fasteners extends through one of the bottle gripping arms and into one of the fastener holes to connect the bottle gripping arms to base. Each of the fasteners has a cylindrical portion and a head. Each of the wear bushings has a wear tubular portion and a wear flat ring portion. Each of the inner bushings has an inner tubular portion and an inner flat ring portion. The inner tubular portion of each of the inner bushings surrounds the cylindrical portion of one of the fasteners and extends into a counter bore in the base. The inner tubular portion of each of the wear bushings surrounds the inner tubular portion of each of the inner bushings such that the wear bushings are located between the inner bushings and the bottle gripping arms. The wear flat ring portion of each of the wear bushings and the inner flat ring portion of each of the inner bushings is sandwiched between the head of one of the fasteners and a top surface of one of the bottle gripping arms.

In yet another aspect of the present invention, a bottle gripping assembly is provided. The bottle gripping assembly comprises a pair of bottle gripping arms, a base, a wear pad, a pair of fasteners and a pair of wear bushings. Each of the bottle gripping arms has a grip member such that when the grip members of the bottle gripping arms are moved toward each other, the pair of bottle gripping arms can grip a bottle therebetween. The base is for supporting the pair of bottle gripping arms, with the base having a top surface and a recess into the top surface. The wear pad is located in the recess of the base. The wear pad and the base under the upper surface of the recess have a pair of aligned fastener holes. Each one of the fasteners extends through one of the bottle gripping arms and into one of the fastener holes to connect the bottle gripping arms to the wear pad and the base. Each of the wear bushings has a tubular portion, with the tubular portion of each of the wear bushings extending into one of the bottle gripping arms and surrounding a portion of the fasteners.

BRIEF DESCRIPTION OF THE DRAWINGS

One or more, embodiments of the present invention are illustrated by way of example and should not be construed as being limited to the specific embodiments depicted in the accompanying drawings, in which like reference numerals indicate similar elements.

FIG. 6 is a top view of the base plate of the bottle gripping assembly of the present invention.

FIG. 7 is a side view of the base plate of the bottle gripping assembly of the present invention.

Figure 1A:
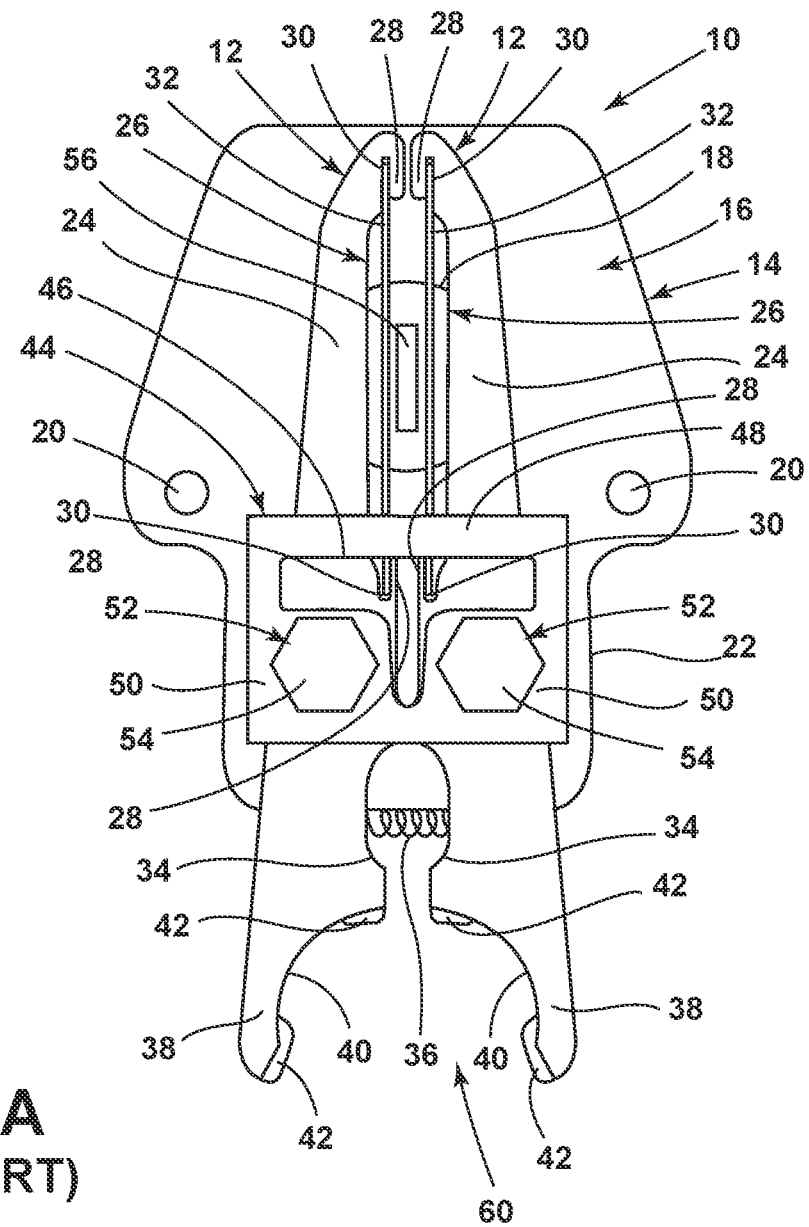
FIG. 1A is a top view of a prior art bottle gripping assembly.
Figure 1B:
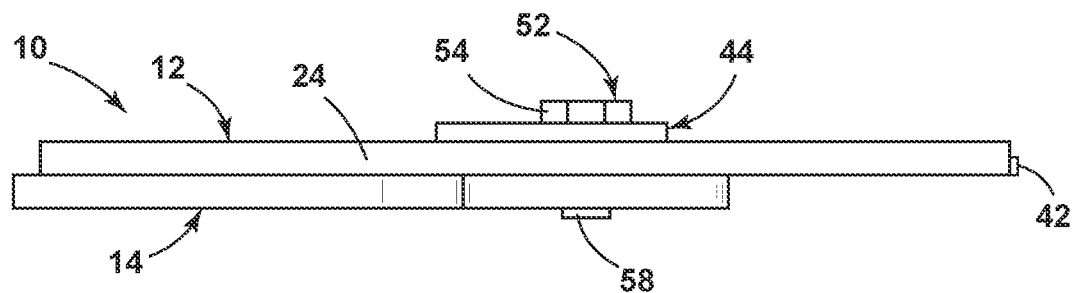
FIG. 1B is a side view of the prior art bottle gripping assembly.

The specific devices and processes illustrated in the attached drawings and described in the following specification are simply exemplary embodiments of the inventive concepts. Hence, specific dimensions and other physical characteristics relating to the embodiments disclosed herein are not to be considered as limiting.

DETAILED DESCRIPTION

For purposes of description herein, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 100 (FIGS. 2A-3B) generally designates a bottle gripping assembly of the present invention. The bottle gripping assembly 100 of the present invention includes an improved base plate 102, a wear bushing 104 and an inner bushing 106. Moreover, while the top holder bracket 44 of the prior art is omitted, the grip arms 12a, the spring 36a and the bolts 52a remain the same. Since the grip arms 12a, the spring 36a and the bolts 52a are identical to the previously described grip arms 12, spring 36 and bolts 52, similar parts appearing in FIGS. 2A-3B are represented by the same, corresponding reference number, except for the suffix "a" in the numerals of FIGS. 2A-3B.

In the illustrated example, the improved base plate 102 (FIGS. 3A-7) supports the grip arms 12a. The improved base plate 102 includes a rear wide portion 108 having a central actuator opening 110. The rear wide portion 108 of the base plate 102 is also shown as including a plurality of fastener opening 112 for accepting fasteners 116 therethrough for connecting the base plate 102 to a wheel 114 of the conveyor system (see FIG. 2B). The base plate 102 also includes a front narrow support portion 118 having a cutaway top area 120, with a step 122 between the rear wide portion 108 and the cutaway top area 120. The front narrow support portion 118 includes a pair of bolt openings 124 and counterbores 126 extending into the front narrow support portion 118 from the cutaway top area 120.

The bottle gripping assembly 100 of the present invention includes several features for reducing wear with the grip arms 12a. For example, the improved base plate 102 includes a rectangular wear pad 130 located within the cutaway top area 120. The rectangular wear pad 130 includes a pair of bolt holes 132. The rectangular wear pad 130 has a top surface 134 that supports the grip arms 12a adjacent the bolts 52a. The wear pad 130 is formed of a material that provides support for the grip arms 12a, but also provides for sufficient friction to allow for the grip arms 12a to move under activation of the actuator 56. For example, the wear pad 130 can be made of polyether ether ketone (PEEK) or similar materials.

Figure 4:
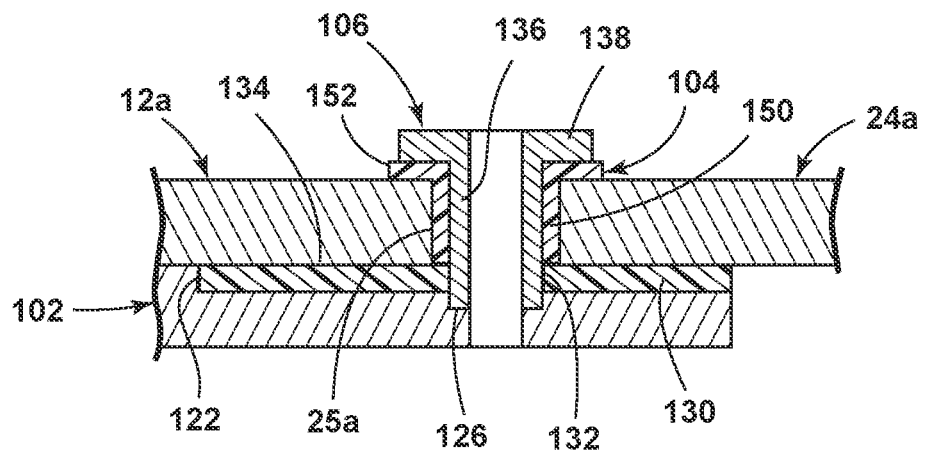
FIG. 4 is a partial cross-section view of the bottle gripping assembly of the present invention.
Figure 5:
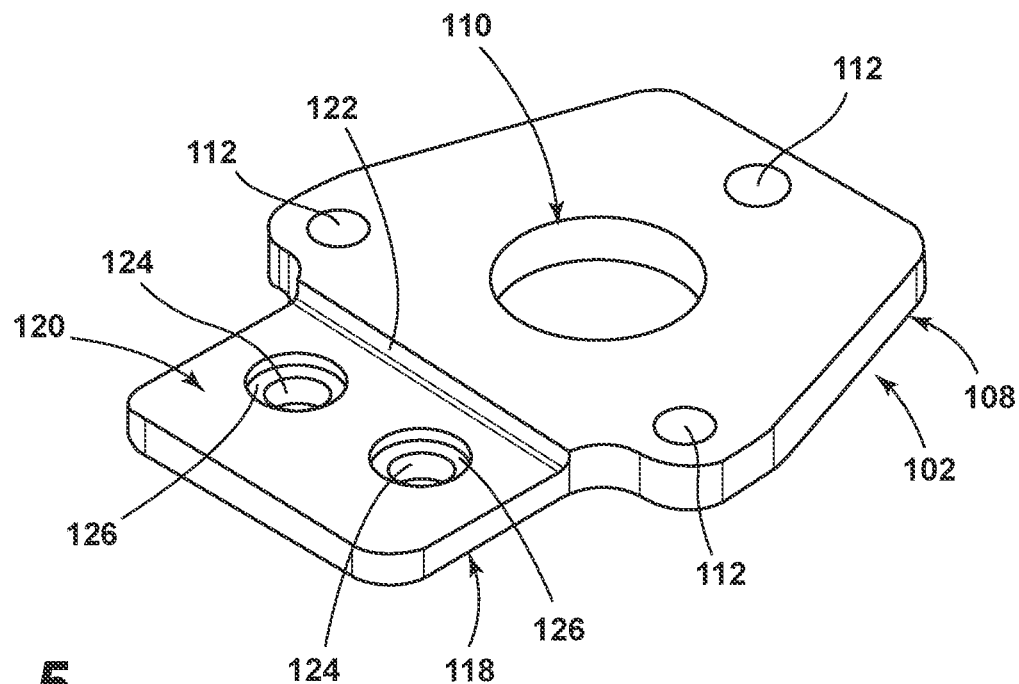
FIG. 5 is a perspective view of a base plate of the bottle gripping assembly of the present invention.

In the illustrated example, the wear bushing 104 and the inner bushing 106 also reduce wear of the grip arms 12a. The inner bushing 106 includes a cylindrical portion 136 and a top flat portion 138. The cylindrical portion 136 extends through a bolt hole 25a in the middle area of the main section 24a of the grip arms 12a, through the bolt holes 132 of the wear pad 130 and into the counterbore 126 extending into the front narrow support portion 118 of the base plate 102 as shown in FIG. 4. The cylindrical portion 136 of the inner bushing 106 accepts the cylindrical portion 58a of the bolt 52 therethrough. The inner bushing 106 can be made of any material (e.g., a hard plastic or metal).

The illustrated wear bushing 104 includes a cylindrical portion 150 and a top flat portion 152. The cylindrical portion 150 of the wear bushing 104 surrounds the cylindrical portion 136 of the inner bushing 106 and rests on the top surface 134 of the rectangular wear pad 130 as shown in FIG. 4. The top flat portion 152 of the wear bushing 104 is sandwiched between the top flat portion 138 of the inner bushing 106 and a top surface of the grip arm 12a also as shown in FIG. 4. The wear bushing 104 can be made of any hard material that reduces friction (e.g., a hard plastic).

Figure 2A:
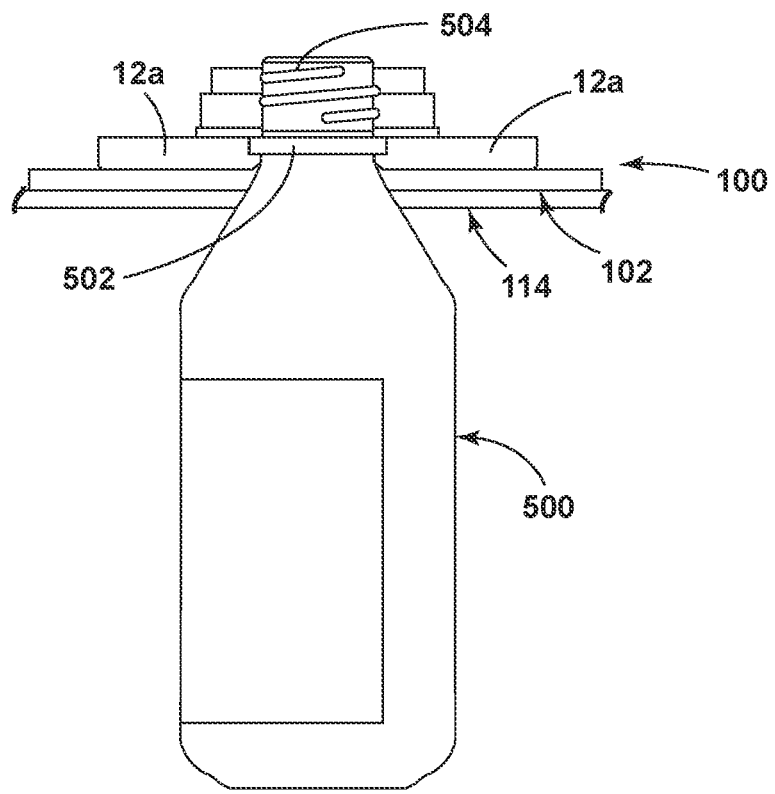
FIG. 2A is a side view of a bottle gripping assembly of the present invention holding a bottle.
Figure 2B:
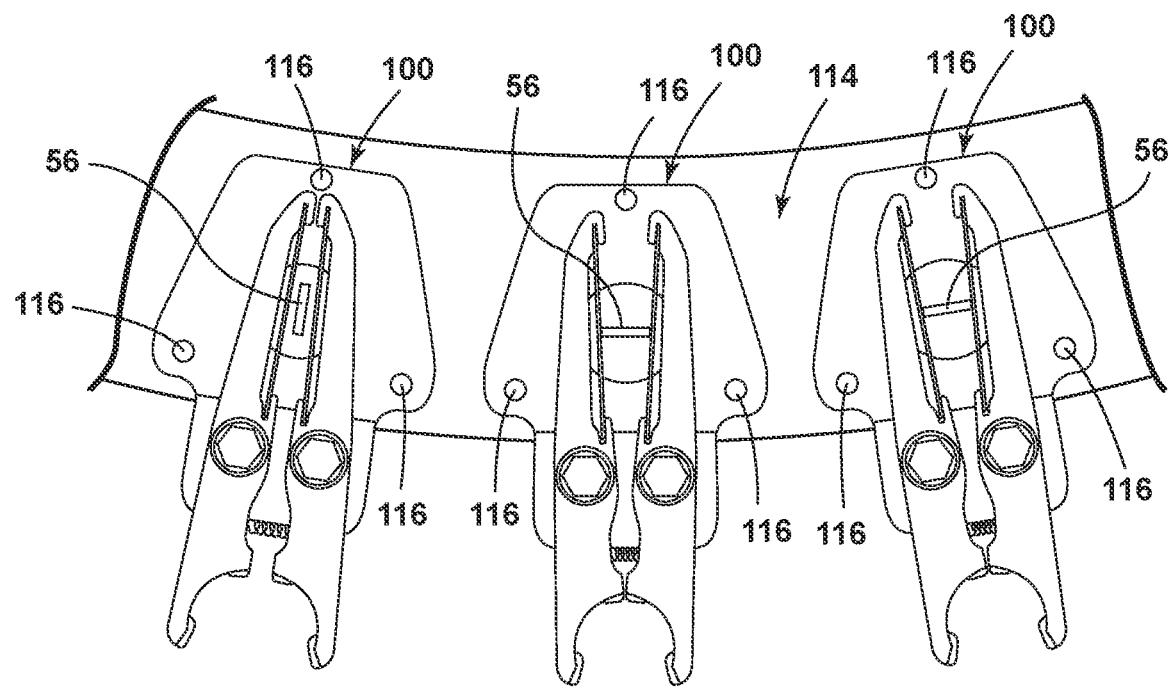
FIG. 2B is a top view of multiple bottle gripping assemblies of the present invention on a filling wheel.
Figure 3A:
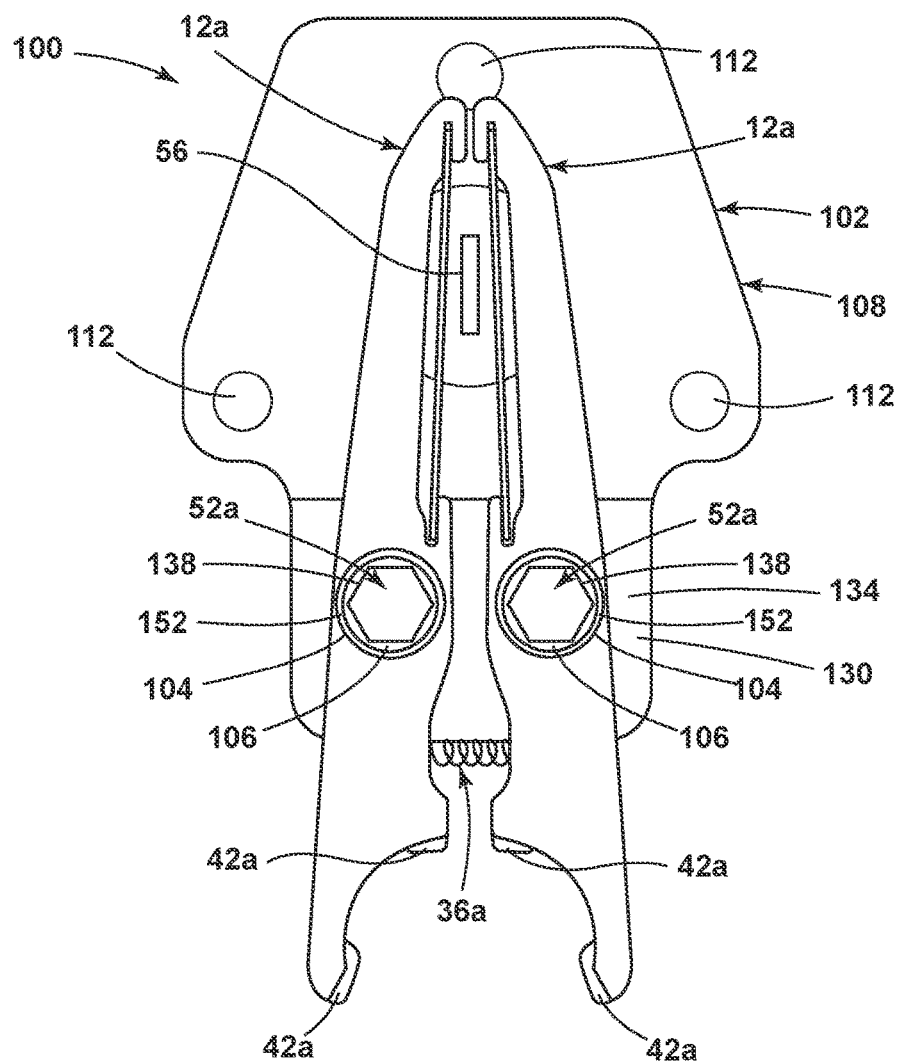
FIG. 3A is a top view of the bottle gripping assembly of the present invention.
Figure 3B:
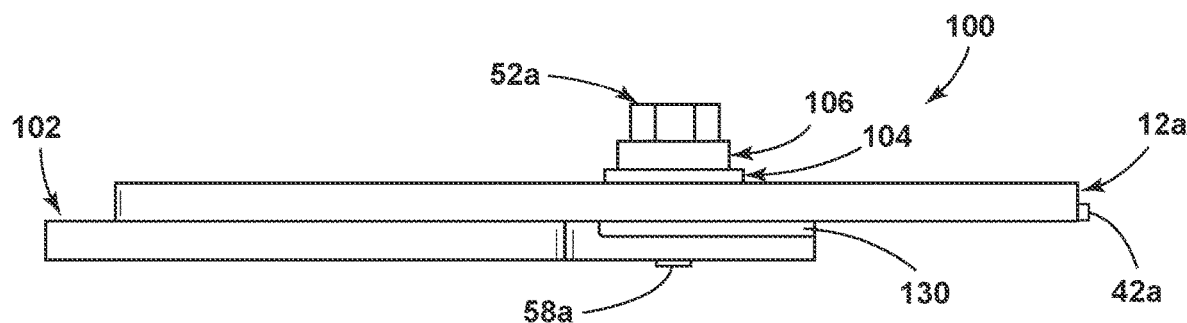
FIG. 3B is a side view of the bottle gripping assembly of the present invention.

During use of the bottle gripping assembly 100 of the present invention, the actuator 56a can be actuated to move the grip arms 12a to grip the bottle 500 as outlined above, with the support lips 42a of the grip arms 12a supporting a top ring 502 of the bottle 500 located below a threaded cylinder 504 of the bottle 500 as shown in FIG. 2A. If the wear pad 130 and the wear bushing 104 become worn, the wear pad 130 and the wear bushing 104 can be replaced quickly and easily, thereby minimizing downtime of the bottling system. Moreover, replacing the wear pad 130 and the wear bushing 104 is less expensive than replacing the entire grip arms 12, top holder bracket 44 and base plate 14 of the prior art, thereby saving substantial money.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A bottle gripping assembly comprising:
a pair of bottle gripping arms, each of the bottle gripping arms having a grip member such that when the grip members of the bottle gripping arms are moved toward each other, the pair of bottle gripping arms can grip a bottle therebetween;
a base for supporting the pair of bottle gripping arms, the base having a top surface and a recess into the top surface such that a step is located between the top surface of the base and an upper surface of the recess;
a wear pad located in the recess of the base, the wear pad having a top face substantially level with the top surface of the base;
the wear pad and the base under the upper surface of the recess having a pair of aligned fastener holes; and
a pair of fasteners, each one of the fasteners extending through one of the bottle gripping arms and into one of the fastener holes to connect the bottle gripping arms to the wear pad and the base, with the wear pad being sandwiched between a bottom surface of the bottle gripping arms and the upper surface of the recess.

2. The bottle gripping assembly of claim 1, wherein:
each of the fasteners extends through the wear pad and the base.

3. The bottle gripping assembly of claim 1, wherein:
the base includes an opening adjacent the pair of bottle gripping arms, the opening being configured to accept an actuator therethrough for actuating the bottle gripping arms to move the grip members of the bottle gripping arms toward each other.

4. The bottle gripping assembly of claim 3, wherein:
each of the bottle gripping arms includes a leaf spring adapted to abut the actuator.

5. The bottle gripping assembly of claim 1, further including:
a spring extending between the pair of bottle gripping arms, the spring biasing the grip members of the pair of bottle gripping arms away from each other.

6. The bottle gripping assembly of claim 1, wherein:
the wear pad is made of polyether ether ketone.

7. The bottle gripping assembly of claim 1, wherein:
each of the fasteners has a cylindrical portion and a head; and further including a pair of wear bushings, each of the wear bushings having a wear tubular portion and a wear flat ring portion, the wear tubular portion of each of the wear bushings surrounding the cylindrical portion of one of the fasteners and extending through the bottle gripping arms;
with the wear flat ring portion of each of the wear bushings being sandwiched between the head of one of the fasteners and a top surface of one of the bottle gripping arms.

8. The bottle gripping assembly of claim 7, further including:
a pair of inner bushings, each of the inner bushings having an inner tubular portion and an inner flat ring portion;
the inner tubular portion of each of the inner bushings surrounding the cylindrical portion of one of the fasteners and extending through the wear pad and into a counter bore in the upper surface of the recess;
the inner tubular portion of each of the wear bushings surrounding the inner tubular portion of each of the inner bushings such that the wear bushings are located between the fasteners and the bottle gripping arms; and
the wear flat ring portion of each of the wear bushings and the inner flat ring portion of each of the inner bushings being sandwiched between the head of the fastener and the top surface of the bottle gripping arms.

9. A bottle gripping assembly comprising:
a pair of bottle gripping arms, each of the bottle gripping arms having a grip member such that when the grip members of the gripping arms are moved toward each other, the pair of bottle gripping arms can grip a bottle therebetween;
a base for supporting the pair of bottle gripping arms, the base having a top surface and a pair of fastener holes extending into the base;
a pair of fasteners, each one of the fasteners extending through one of the bottle gripping arms and into one of the fastener holes to connect the bottle gripping arms to base, each of the fasteners having a cylindrical portion and a head;
a pair of wear bushings, each of the wear bushings having a wear tubular portion and a wear flat ring portion; and
a pair of inner bushings, each of the inner bushings having an inner tubular portion and an inner flat ring portion;
the inner tubular portion of each of the inner bushings surrounding the cylindrical portion of one of the fasteners and extending into a counter bore in the base;
the inner tubular portion of each of the wear bushings surrounding the inner tubular portion of each of the inner bushings such that the wear bushings are located between the inner bushings and the bottle gripping arms; and
the wear flat ring portion of each of the wear bushings and the inner flat ring portion of each of the inner bushings being sandwiched between the head of one of the fasteners and a top surface of one of the bottle gripping arms.

10. The bottle gripping assembly of claim 9, wherein:
each of the fasteners extends through the base.

11. The bottle gripping assembly of claim 9, wherein:
the base includes an opening adjacent the pair of bottle gripping arms, the opening being configured to accept an actuator therethrough for actuating the bottle gripping arms to move the grip members of the bottle gripping arms toward each other.

12. The bottle gripping assembly of claim 11, wherein:
each of the bottle gripping arms includes a leaf spring adapted to abut the actuator.

13. The bottle gripping assembly of claim 9, further including:

a spring extending between the pair of bottle gripping arms, the spring biasing the grip members of the pair of bottle gripping arms away from each other.

14. The bottle gripping assembly of claim 9, wherein:
the base has a recess into the top surface such that a step is located between the top surface of the base and an upper surface of the recess;
further including a wear pad located in the recess of the base, the wear pad having a top face substantially level with the top surface of the base.

15. The bottle gripping assembly of claim 14, wherein:
the wear pad is made of polyether ether ketone.

16. A bottle gripping assembly comprising:
a pair of bottle gripping arms, each of the bottle gripping arms having a grip member such that when the grip members of the bottle gripping arms are moved toward each other, the pair of bottle gripping arms can grip a bottle therebetween;
a base for supporting the pair of bottle gripping arms, the base having a top surface and a recess into the top surface;
a wear pad located in the recess of the base;
the wear pad and the base under the upper surface of the recess having a pair of aligned fastener holes;
a pair of fasteners, each one of the fasteners extending through one of the bottle gripping arms and into one of the fastener holes to connect the bottle gripping arms to the wear pad and the base; and
a pair of wear bushings, each of the wear bushings having a tubular portion, the tubular portion of each of the wear bushings extending into one of the bottle gripping arms and surrounding a portion of the fasteners.

17. The bottle gripping assembly of claim 16, wherein:
each of the fasteners extends through the base.

18. The bottle gripping assembly of claim 16, wherein:
the base includes an opening adjacent the pair of bottle gripping arms, the opening being configured to accept an actuator therethrough for actuating the bottle gripping arms to move the grip members of the bottle gripping arms toward each other.

19. The bottle gripping assembly of claim 18, wherein:
each of the bottle gripping arms includes a leaf spring adapted to abut the actuator.

20. The bottle gripping assembly of claim 16, further including:
a spring extending between the pair of bottle gripping arms, the spring biasing the grip members of the pair of bottle gripping arms away from each other.

21. The bottle gripping assembly of claim 16, wherein:
the base has a recess into the top surface such that a step is located between the top surface of the base and an upper surface of the recess; and
the wear pad is located in the recess of the base, with the wear pad having a top face substantially level with the top surface of the base.

22. The bottle gripping assembly of claim 16, wherein:
the wear pad is made of polyether ether ketone.

23. The bottle gripping assembly of claim 16, further including:
a pair of inner bushings, each of the inner bushings having an inner tubular portion and an inner flat ring portion;
the inner tubular portion of each of the inner bushings surrounding the cylindrical portion of one of the fasteners and extending through the wear pad and into a counter bore in the base;
the inner tubular portion of each of the wear bushings surrounding the inner tubular portion of each of the inner bushings such that the wear bushings are located between the inner bushings and the bottle gripping arms; and
the wear flat ring portion of each of the wear bushings and the inner flat ring portion of each of the inner bushings being sandwiched between the head of one of the fasteners and a top surface of one of the bottle gripping arms.

24. A bottle gripping assembly comprising:
a pair of bottle gripping arms, each of the bottle gripping arms having a grip member such that when the grip members of the bottle gripping arms are moved toward each other, the pair of bottle gripping arms can grip a bottle therebetween;
a base for supporting the pair of bottle gripping arms, the base having a top surface, the base having a pair of first fastener holes;
a wear pad located between the pair of bottle gripping arms and the base, the wear pad having a pair of second fastener holes;
a pair of fasteners;
a first one of the fasteners extending through a first one of the first fastener holes of bottle gripping arms and into a first one of the second fastener holes of the wear pad to connect a first one of the bottle gripping arms to the wear pad and the base;
a second one of the fasteners extending through a second one of the first fastener holes of bottle gripping arms and into a second one of the second fastener holes of the wear pad to connect a second one of the bottle gripping arms to the wear pad and the base;
the wear pad being sandwiched between a bottom surface of the bottle gripping arms and the base; and
a pair of wear bushings, each of the wear bushings having a tubular portion, the tubular portion of each of the wear bushings extending into one of the bottle gripping arms and surrounding a portion of the fasteners.

* * * * *